March 1, 1949.  C. A. THOMAS  2,463,331
DYNAMOELECTRIC MACHINE MEMBER
Filed Feb. 5, 1948
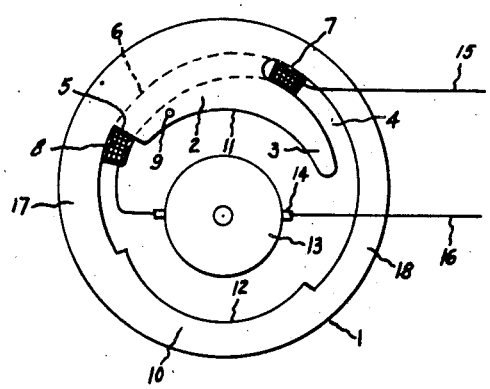
Inventor:
Charles A. Thomas,
by  *Prowell F. Mack*
His Attorney.

Patented Mar. 1, 1949

2,463,331

UNITED STATES PATENT OFFICE 2,463,331

DYNAMOELECTRIC MACHINE MEMBER

Charles A. Thomas, Fort Wayne, Ind., assignor to General Electric Company, a corporation of New York Application February 5, 1948, Serial No. 6,480

6 Claims. (Cl. 171—252)

This invention relates to stationary members for dynamoelectric machines and more particularly to such members having salient poles adapted to receive field windings.

An object of this invention is to provide an improved stationary member for a dynamoelectric machine.

Another object of this invention is to provide an improved stationary member for dynamoelectric machines having a salient pole adapted to have a field coil assembled thereon without increasing the mean length of turn of the coil.

A further object of this invention is to provide an improved stationary member for a dynamoelectric machine adapted for use with a single field coil.

Further objects and advantages of this invention will become apparent and the invention will be better understood by reference to the accompanying description and drawing. The features of novelty which characterize this invention will be pointed out with particularity in the claims annexed to and forming a part of this application.

A feature of this invention is the provision of a stationary member for a dynamoelectric machine having a cylindrical yoke portion and a polar projection with one elongated pole tip. The pole tip with the yoke defines a slot in which one side of a field coil is positioned. The radial depth of the yoke on the side of the polar projection remote from the pole tip is greater than the radial depth of the yoke on the side adjacent the pole tip and slot thereby permitting the field coil to be assembled on the polar projection without increasing its mean length of turn. This feature permits the construction of a stator having only one field coil and a minimum size consequent pole, since the additional turns required in the coil can be accommodated with the unequal radial depths of the yoke sides. An additional feature of this invention is the provision of a greatly shortened magnetic return path which carries a preponderance of the operating flux.

In the drawing, there is shown a side elevational view of a stationary member for a dynamoelectric machine embodying the improved construction of this invention.

Referring to the drawing, there is shown a stationary or stator member for a dynamoelectric machine having a cylindrical yoke portion 1, which may be conveniently formed of a plurality of relatively thin laminations of magnetic material, or which may be formed as an integral unit. The yoke portion is provided with a polar projection or salient pole 2 projecting radially inward therefrom, shown here as being formed integrally with the polar projection. This polar projection has one elongated pole tip 3 which defines, with the yoke portion 1, a slot 4. The other side of the polar projection 2 presents a substantially flat surface 5.

A field exciting coil 6 is provided having a side 7, shown here in cross section, positioned in the slot 4 between the pole tip 3 and the yoke portion 1. The opposite side 8 of the coil 6 is positioned in the seat provided by the flat surface 5 of polar projection 2 and the yoke portion 1. A pin 9, inserted in a suitable opening in the polar projection 2, holds the field coil 6 in its assembled position on the pole.

The yoke portion 1 is also provided with another salient polar projection or pole 10, diametrically opposite from the polar projection 2. This polar projection is shown relatively much smaller in physical size and is not provided with a field coil thereby forming a consequent pole for the polar projection 2. The pole face 11 of polar projection 2 and the pole face 12 of polar projection 10 define a central bore in which is rotatably positioned a suitable rotor or armature member, which may be conveniently provided with a commutator, shown here schematically as 13. The field coil 6 is shown connected in series relationship with the armature through brushes 14 to external leads 15 and 16. While the drawing shows a series connection, it is to be understood that a shunt or other arrangement could be utilized.

In order to permit assembling the field coil 6 on the polar projection 2 without distortion and without increasing the mean length of turn, the arrangement now to be described is provided. It can be readily seen with reference to the drawing, that if the radial depth of the yoke portion 1 between the polar projections 2 and 10 was the same on the side remote from the pole tip 3 as on the side adjacent the pole tip, there would not be enough room for the field coil 6 on the pole tip side. Therefore, the radial depth of the yoke section 17 between the polar projections on the side remote from the pole tip is increased thus permitting a corresponding reduction in the radial depth of the yoke section 18 between the polar projections on the side adjacent the pole tip and the slot 4. It will be noted that this construction provides adequate flux capacity since the combined yoke sections 17 and 18 in cross sectional area are no smaller than the conventional yoke. It can now be readily understood that the field coil 6 can be assembled on the polar projection 2 without increasing the mean length of turn. This construction permits forming the polar projection 2 integral with the yoke portion 1 thereby providing an economical construction. Furthermore, assembly of the field coil on the polar projection is facilitated and damage during assembly prevented since the coil need not be distorted from its original pre-wound form during assembly.

In the embodiment shown using a single field coil, the consequent pole 10 can be of greatly reduced size. Therefore, to reduce the overall size of the machine, the centerline of the rotor and bore is made eccentric with respect to the centerline of the cylindrical yoke portion 1. This construction is particularly applicable to dynamoelectric machines utilizing a single field coil since the thickness of the field coil can be considerably increased for a given outside diameter of the yoke portion and inside diameter of the bore. In addition, the short stator yoke path through the yoke portion 17 carries a preponderance of the flux providing a more efficient machine. While a stator member is shown having only one polar projection adapted to receive a field coil, it will be readily understood that the invention described above could be applied to a machine having both polar projections adapted to receive field coils.

An advantage of this construction as applied particularly to motors, which can readily be seen from the accompanying drawing, is the fact that the distance from the mounting surface to the shaft can be much smaller than that of the conventional motor. Another advantage becomes apparent when this construction is utilized in a gear motor. The output shaft may be eccentrically mounted in the motor end shield, for instance with the same eccentricity from the center of the stator yoke as the rotor shaft. By rotation of the end shield about the center of the stator yoke, the output shaft gear within the end shield can be properly meshed with the gear on the rotor shaft since there is considerable latitude available in the distance between the center of the output gear and the center of the shaft gear. This feature also permits the use of different size gears on the output and rotor shafts giving a wider range of gear ratios than is ordinarily provided in a conventional gear motor of the same frame size.

While there has been illustrated and described a particular embodiment of this invention, it will occur to those skilled in the art that changes and modifications may be made without departing from the invention in its broader aspects and it is intended in the appended claims to cover all such modifications as fall within the true spirit and scope of this invention.

What I claim as new and desire to secure by Letters Patent of the United States is:

1. A stationary member for a dynamoelectric machine having a circular yoke portion and a polar projection extending inwardly from said yoke portion adapted to receive a field coil for said dynamoelectric machine, said polar projection having one substantially elongated pole tip defining with said yoke portion a slot for receiving a side of said coil, the radial depth of said yoke portion on the side of said polar projection remote from said pole tip being greater than the radial depth of said yoke portion on the side of said polar projection adjacent said pole tip and said slot whereby said coil can be assembled on said polar projection without increasing its mean length of turn.

2. A stationary member for a dynamoelectric machine having a circular yoke portion and a polar projection extending inwardly from said yoke portion adapted to receive a field coil for said dynamoelectric machine, said polar projection having one substantially elongated pole tip on one side thereof defining with said yoke portion a slot for receiving a side of said coil, the other side of said polar projection having a substantially flat surface providing a seat for the side of said coil opposite said first-named side, the radial depth of said yoke portion adjacent said flat side of said polar projection being greater than the radial depth of said yoke portion adjacent said pole tip and said slot whereby said coil can be assembled on said polar projection without increasing its mean length of turn.

3. A stationary member for a dynamoelectric machine having a circular yoke portion, a polar projection extending inwardly from said yoke portion adapted to receive a field coil for said dynamoelectric machine, said polar projection having one substantially elongated pole tip defining with said yoke portion a slot for receiving a side of said coil, and another polar projection extending inwardly from said yoke portion forming a consequent pole for said first-named polar projection, the radial depth of said yoke portion between said polar projections on the side remote from said pole tip being greater than the radial depth of said yoke portion between said polar projections on the side adjacent said pole tip and said slot whereby said coil can be assembled on said first-named polar projection without increasing its mean length of turn.

4. A stationary member for a dynamoelectric machine having a circular yoke portion, a polar projection extending inwardly from said yoke portion adapted to receive a field coil for said dynamoelectric machine, said polar projection having one substantially elongated pole tip defining with said yoke portion a slot for receiving a side of said coil, and another polar projection extending inwardly from said yoke portion forming a consequent pole for said first-named polar projection, said polar projections defining a central bore for receiving a rotatable member, the centerline of said bore being eccentric with respect to the centerline of said yoke portion, the radial depth of said yoke portion between said polar projections on the side remote from said pole tip being greater than the radial depth of said yoke portion between said polar projections on the side adjacent said pole tip and slot whereby said coil can be assembled on said first-named polar projection without increasing its mean length of turn.

5. A stationary member for a dynamoelectric machine having a circular yoke portion, a polar projection extending inwardly from said yoke portion adapted to receive a field coil for said dynamoelectric machine, said polar projection having one substantially elongated pole tip defining with said yoke portion a slot for receiving a side of said coil, another polar projection extending inwardly from said yoke portion forming a consequent pole for said first-named polar projection, the radial depth of said yoke portion between said polar projections on the side remote from said pole tip being greater than the radial depth of said yoke portion between said polar projections on the side adjacent said pole tip and said slot whereby said coil can be assembled on said first-named polar projection without increasing its mean length of turn, and means on said first-named polar projection for maintaining said coil in assembled position.

6. A stationary member for a dynamoelectric machine having, a circular yoke portion, a polar projection extending inwardly from said yoke portion adapted to receive a field coil for said dynamoelectric machine, said polar projection having one substantially elongated pole tip on one side thereof defining with said yoke portion a slot for receiving a side of said coil, the other side of said polar projection having a substantially flat surface providing a seat for the side of said coil opposite said first-named side, and another polar projection extending inwardly from said yoke portion forming a consequent pole for said first-named polar projection, the radial depth of said yoke portion between said polar projections on the side remote from said pole tip being greater than the radial depth of said yoke portion between said polar projections on the side adjacent said pole tip and said slot whereby said coil can be assembled on said first-named polar projection without increasing its mean length of turn.

CHARLES A. THOMAS.

REFERENCES CITED

The following references are of record in the file of this patent:

UNITED STATES PATENTS

| Number | Name | Date |
| --- | --- | --- |
| 665,337 | Merrick | Jan. 1, 1901 |
| 2,240,652 | Jenkins | May 6, 1941 |